United States Patent Office 2,720,803
Patented Oct. 18, 1955

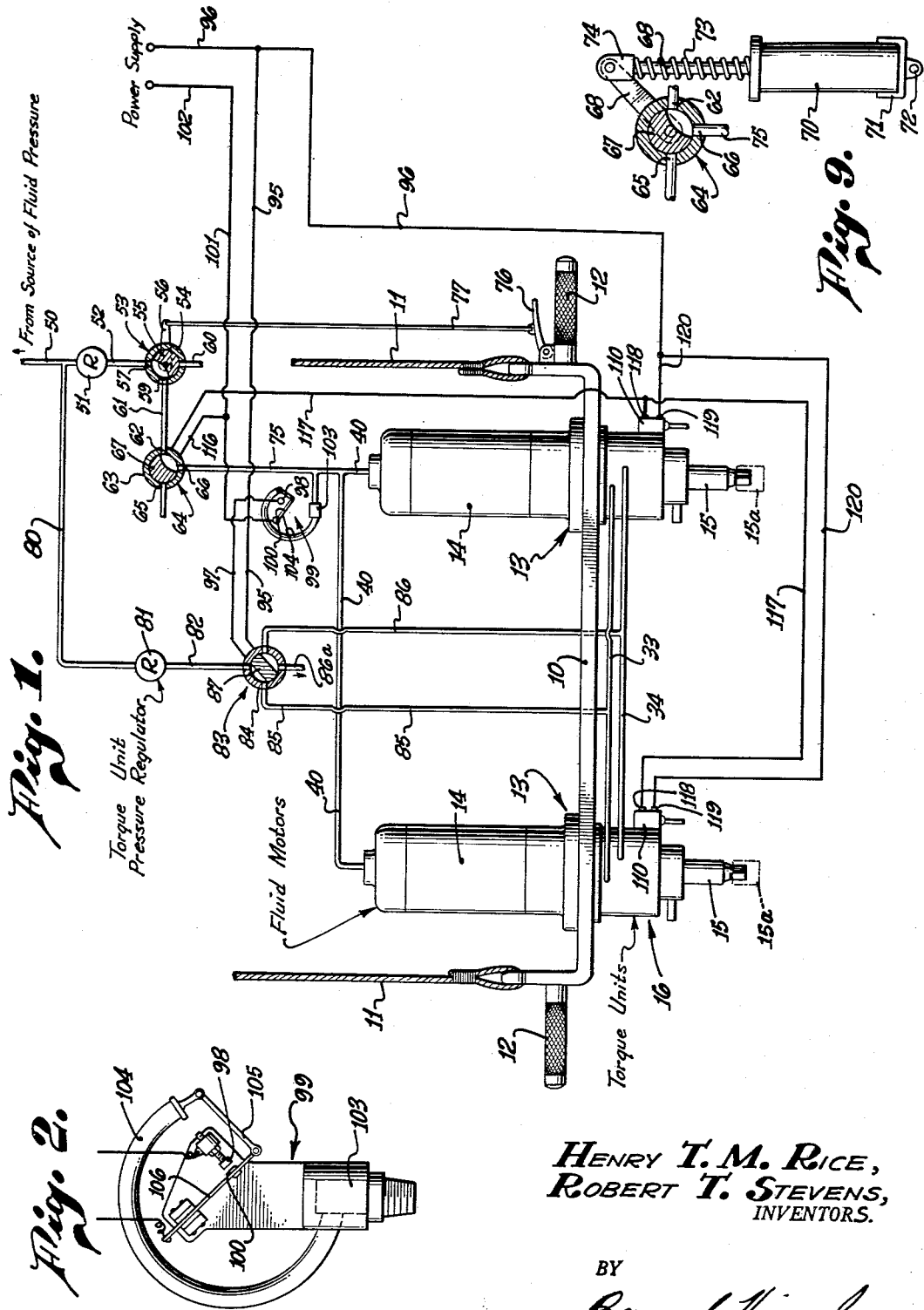

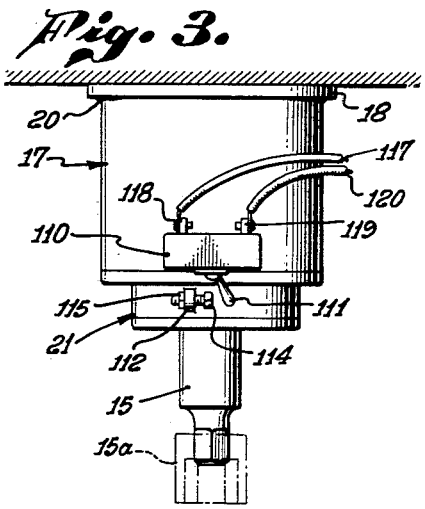
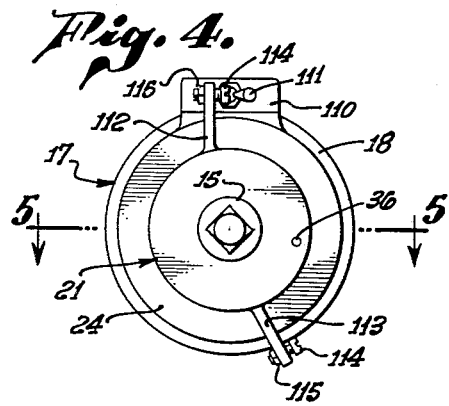
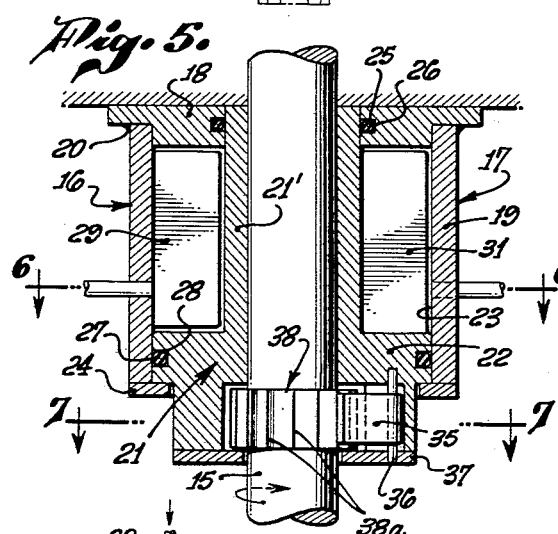
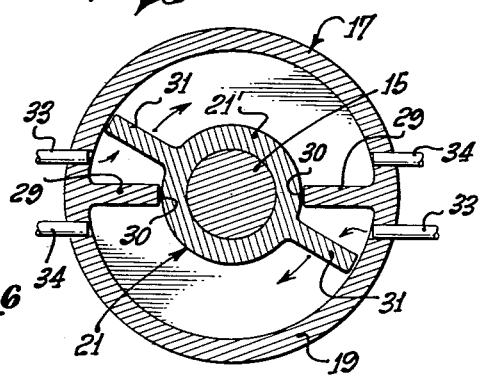
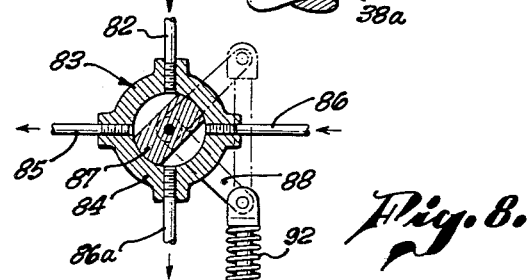
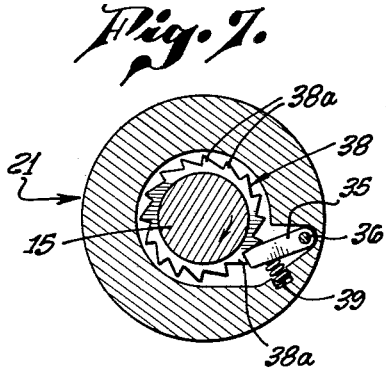
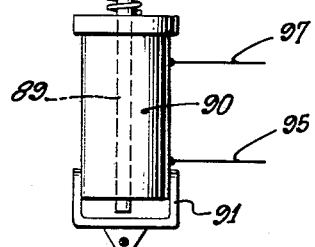
HENRY T. M. RICE,
ROBERT T. STEVENS,
INVENTORS
BY
Bernard Kriegel
ATTORNEY.

2,720,803

MULTIPLE STAGE APPARATUS FOR TIGHTENING THREADED FASTENING ELEMENTS

Henry T. M. Rice, San Gabriel, and Robert T. Stevens, Altadena, Calif., assignors to Dillon Stevens, Los Angeles, Calif.

Application October 20, 1952, Serial No. 315,796

15 Claims. (Cl. 81—52.4)

The present invention relates to torque transmitting apparatus, and more particularly to apparatus for tightening threaded fastening elements, such as screws, nuts, bolts, studs, and the like.

An object of the present invention is to provide apparatus for tightening a threaded fastening element in stages, tightening of the element to a predetermined preliminary extent initiating the operation of tightening the element to a further extent. If desired, a plurality of threaded fastening elements may be tightened simultaneously in this manner.

Another object of the invention is to provide apparatus for simultaneously tightening a plurality of threaded fastening elements in stages, tightening of the elements to a preliminary extent being obtainable under comparatively high speed operating conditions, whereas their tightening to the final, predetermined degree is obtained under relatively slow speed conditions, to avoid and minimize inaccuracies that would otherwise be caused by inertia forces, vibration, motor impulses, heating, galling, and the like. The rapid run down and preliminary tightening of the threaded elements, followed by the final tightening under low speed conditions, still accomplishes the desired tightening of the elements in a comparatively rapid manner.

A further object of the invention is to provide a multiple or gang apparatus for simultaneously tightening a plurality of threaded fastening elements, in which the application of torque is maintained on all elements during and subsequent to their tightening to insure final tightening of all elements to the same predetermined torque value, despite the fact that one element may tend to reach its final tightness before another torque element.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a somewhat diagrammatic view of an apparatus or system for tightening one or a plurality of threaded fastening elements;

Fig. 2 is a side elevation of a pressure operated electrical switch forming part of the system disclosed in Fig. 1;

Fig. 3 is a side elevation of one of the torque units for finally tightening a threaded fastening element;

Fig. 4 is an enlarged bottom plan view of the apparatus shown in Fig. 3;

Fig. 5 is an enlarged section taken along the line 5—5 on Fig. 4;

Fig. 6 is a cross-section taken along the line 6—6 on Fig. 5;

Fig. 7 is a cross-section taken along the line 7—7 on Fig. 5;

Fig. 8 is a sectional and elevational view of a four-way solenoid actuated valve forming part of the system disclosed in Fig. 1;

Fig. 9 is a sectional and elevational view of a three-way solenoid actuated valve forming part of the system shown in Fig. 1.

The apparatus disclosed in the drawings is designed for simultaneously tightening a plurality of threaded fastening elements (not shown), such as nuts, bolts, studs, screws, and the like, to a predetermined torque value. It includes a main support or frame 10 that may be suitably suspended by a plurality of cables 11, and which may be manipulated into position with respect to the threaded fastening elements by grasping the handles 12 extending from opposite sides of the frame.

Mounted upon the frame are a plurality of multiple stage torque applying devices 13 that are capable of tightening the threaded fastening elements to a predetermined final torque value. Each device includes an apparatus for accomplishing a preliminary tightening of a threaded fastening element. Such device is power operated and may be of any suitable form. It may embody a fluid motor 14 of the stall type capable of imparting its rotation to a driven shaft or spindle 15, on the outer end of which is mounted a suitable tool, such as a wrench socket 15a, for application to a nut or other threaded fastening element. The fluid motor 14 has fluid under pressure directed to it, and will rapidly rotate the shaft 15 until the threaded fastening element has been tightened to a torque corresponding to the pressure applied to the motor, whereupon the motor will stall, thereby indicating to the operator that the threaded fastening element has been tightened to a particular and predetermined degree. Thereafter, the driven shaft or spindle 15 has a further torque, greater than the torque imposed by the upper fluid motor operated apparatus 14, applied to it, this torque being supplied by a second torque unit 16 which comes into play after the first torque unit or apparatus has stalled, or has otherwise imposed a predetermined torque tightening on the threaded fastening elements.

As disclosed in the drawings, and particularly in Figs. 5, 6 and 7, the second stage torque unit 16 includes a housing or stator 17 embodying an end closure member 18 suitably secured to the frame 10 of the apparatus and a cylindrical housing portion 19 piloted on the closure, the two parts being suitably secured together, as by use of welding material or solder 20. The driven shaft or spindle 15 of the first stage torquing apparatus 14 extends completely through this housing 17, there being a rotor 21 rotatable on the shaft or spindle 15 and also within the housing 17. This rotor has a hub portion 21 piloted within the end closure 18 and also has an end partition 22 rotatable along the inner wall 23 of the stator housing. The rotor is maintained in assembled relation within the housing by a suitable retainer plate or ring 24 attached to the cylindrical portion 19 of the housing 17 and overlapping the partition 22 of the rotor.

Leakage of fluid between the rotor hub 21 and end closure 18 is prevented by a suitable side seal 25 disposed in a groove 26 in the closure and bearing against the periphery of the hub 21. Leakage between the rotor 21 and stator 17 is also prevented by another suitable side seal 27 contained within a peripheral groove 28 in the rotor partition 22 and slidably and sealingly engaging the inner wall 23 of the stator housing.

The stator 17 has a plurality of diametrically opposed vanes 29 extending inwardly from its wall 23 and terminating adjacent the periphery of the rotor hub 21, the end portions 30 of the vanes slidably engaging the hub. The rotor 21 itself has a pair, or a plurality, of diametrically opposed vanes 31 extending radially outward from its hub 21 and with the outer end portions 32 slidably engaging the cylindrical inner wall 23 of the stator housing. The stator vanes 29 extend from the end closure 18 to the partition 22 of the rotor, with which they are in slidable engagement. Similarly, the rotor vanes 31 extend from the partition 22 toward the end closure 18, with which they are in slidable sealing engagement. The sliding fit between the stator vanes 29 and rotor 21 and the rotor vanes 31 and the stator 17 is such that very little fluid can leak thereby.

The rotor 21 is actuated with respect to the stator 17 by fluid under pressure entering the stator housing immediately adjacent the stator vanes 29. Looking in a closewise direction, as disclosed in Fig. 6, the fluid under pressure may enter the stator housing through a pair of forward actuating lines 33, this fluid acting upon the rotor vanes 31 to shift the rotor 21 arcuately, the fluid on the low pressure side of the rotor vanes 31 exhausting through the reverse actuating lines 34 communicating with the stator housing on the opposite side of the stator vanes 29, and being disposed immediately adjacent thereto.

The rotation of the rotor 21 is transmitted to the driven shaft or spindle 15 through a one-way or overrunning clutch, which enables the spindle 10 to be rotated by the first stage apparatus 14 without operating the second stage apparatus 16. The overrunning clutch can assume any desired form. As illustrated, it includes a power pawl 35 pivotally mounted on a pin 36 secured to the rotor 21 and an end plate 37 suitably attached to the rotor, this power pawl being urged into engagement with a toothed ratchet 38, integral with the driven shaft or spindle 15, or otherwise suitably secured thereto, by a helical compression spring 39 disposed between the free end of the power pawl 36 and the rotor 21. As disclosed in the drawings, rotation of the rotor 21 in a clockwise direction will cause the pawl 35 to engage the ratchet teeth 38a and correspondingly rotate the driven shaft 15. However, rotation of the rotor 21 in the opposite direction will not correspondingly rotate the driven shaft 15, since the pawl 35 is automatically disconnected from the ratchet and will merely ride freely or ratchet over its teeth 38a.

In the operation of each unit, fluid under pressure is first directed to the first stage motor through a suitable line 40 to cause the motor 14 to rotate the driven shaft 15, wrench socket 15a and threaded fastening element (not shown), in order to tighten the latter to a preliminary torque value that is determined by the stalling of the motor 14 with the pressure applied thereto. Such rotation can occur without affecting the second or final stage torque unit 16, since the clutch 35, 38, will merely overrun, and, in effect, disconnect the driven shaft 15 from the final stage unit 16.

After the first stage motor 14 has stalled, fluid is allowed to enter the second stage stator housing 17 through the forward actuating lines 33 under the pressure corresponding to the final torque tightening desired, this fluid under pressure acting upon the rotor vanes 31, which are then disposed adjacent the stator vanes 29 and the forward actuating lines 33, the motion of the rotor 21 being transmitted through the overrunning clutch 35, 38, to the driven shaft or spindle 15, until the second stage fluid unit 16 stalls, which indicates that the threaded fastening element has been tightened to the final desired extent. Inasmuch as the threaded fastening element has been tightened to a preliminary extent by the upper torque apparatus 14, the lower torque apparatus need only turn the driven shaft 15, wrench socket 15a, and threaded fastening element a small fraction of a revolution to achieve the final tightening, at which the second stage fluid motor 16 will stall, and this tightening will ordinarily occur before the rotor vanes 31 have been moved into engagement with the opposite stator vanes 29.

When it is desired to reverse the rotation of the rotor 21, then fluid is allowed to enter the reverse actuating lines 34 for application upon the opposite faces of the rotor vanes 31, in order to shift the rotor back to its initial starting position. Such motion occurs without imparting motion to the driven shaft 15 and wrench socket 15a because of the automatic disconnection effected by the overrunning clutch 35, 38.

The fluid for operating the motors 14 of the preliminary tightening apparatus is derived from a suitable source (not shown) and passes through a line 50, to a pressure regulator valve 51, where the pressure is decreased to the desired extent corresponding to the preliminary torque tightening desired at which the fluid motors 14 will stall. From the pressure regulator 51 this fluid passes through a line 52 connected to a threeway valve 53 of a conventional type, which includes a body 54 and a rotor or head 55 having a suitable valve arm 56 attached thereto. Normally, the head 55 is in such position as to close the inlet 57 to the valve body 54, establishing communication between an outlet 59 from the valve body and a port 60 leading to the atmosphere. However, upon actuation of the rotor 55, as by turning the valve arm 56 through ninety degrees, the rotor is shifted to the position disclosed in Fig. 1, in which the exhaust port 60 is closed and the valve body inlet 57 is placed in communication with the outlet 59.

The outlet 59 has a line 61 connected to it extending to an inlet 62 of the valve body 63 forming part of a three-way solenoid operated valve structure 64. This valve body 63 has an exhaust port or line 65 diametrically opposite its inlet 62, and an outlet port 66 substantially ninety degrees to the inlet 62. A valve rotor or head 67 is rotatable in the valve body 63, and has an arm 68 attached to it (Fig. 9) which is pin connected to a solenoid plunger 69 movable within a solenoid coil 70. The latter is suitably supported from a bracket 71 that may be mounted on a suitable pivot 72. A return spring 73 encompasses the solenoid plunger 69, bearing against the container of the solenoid coil 70 and against the upper end 74 of the plunger, urging the valve arm 68 in a direction in which the valve head 67 is positioned in the body 63 to establish communication between the inlet 62 and the outlet 66, allowing fluid to flow through the outlet line 75, and through the lines 40 to the fluid motor of each apparatus 14. When the circuit through the solenoid coil 70 is completed, its companion plunger 69 is drawn within the coil 70 to shift the rotor 67 through approximately ninety degrees, closing the inlet 62 to the three-way valve 64 and allowing the fluid in the outlet lines 40, 75 of the fluid motors 14 to exhaust to atmosphere through the port 65.

The three-way valve 53 is under the manual control of the operator, who can depress a control lever 76 disposed on one handle 12, in order to shift a link 77 interconnecting the control lever with the valve arm 56 of the three-way valve, for the purpose of shifting its rotor 55 to a position allowing fluid to pass between the inlet 57 and the outlet 59, and through the three-way solenoid valve 64 to the fluid motors 14 of the first stage torquing apparatus, in order to accomplish rotation of the driven shafts 15 and of the threaded fastening elements, until the latter have been tightened to a preliminary extent, which is less than the final torque desired. When such tightening occurs, then the second or final stage torque units 16 are brought into operation. Such operation is initiated automatically as a result of the stalling of the fluid motors 14 of the first stage apparatus.

The fluid under pressure for the second stage units 16 may be derived from the same source as supplies fluid under pressure to the motors 14 of the first stage, this fluid passing through a suitable line 80, and through a regulator valve 81, where pressure can be adjusted to conform to the desired final torque tightness to be imposed upon the threaded fastening elements. The fluid at the desired pressure passes from the regulator valve 81 through a line 82 leading to a four-way solenoid actuated valve 83 (see Fig. 8). This valve includes a valve body 84 having an outlet line 85 communicating with both of the forward actuating lines 33, and another outlet line 86 communicating with both of the reverse actuating lines 34, the lines 33, 34 leading to the stator housings 17 of the final stage torque units 16.

A rotor 87 in the body 84, has a valve arm 88 attached thereto which is pin connected to a solenoid plunger 89 disposed within a solenoid coil 90 mounted on a bracket 91 that is suitably pivotally mounted. A spring 92 is disposed around the plunger 89 and bears upon the coil housing 90 and upon the plunger itself, urging the latter in a direction out of the coil 90, to shift the plunger 89 to a position in which the rotor or head 87 is located within the valve body 84, as disclosed in broken lines in Fig. 8, wherein the fluid under pressure can flow through the line 85 to the reverse actuating lines 34, for the purpose of shifting the rotors 21 to their initial starting positions, the forward actuating lines 33 being in communication with the exhaust port 86a in the valve body. However, when current is caused to pass through the solenoid coil 90, the plunger 89 is actuated against the force of the return spring 92 to shift the valve rotor or head 87 through ninety degrees to the full line position shown in Fig. 8, for the purpose of communicating the reverse actuating lines 34 with the exhaust line 86a, or to atmosphere, and placing the forward actuating lines 33 in communication with the high pressure line 82, whereupon the rotors 21 are actuated in a forward direction to transmit their motion through the overrunning clutch 35, 38 to the driven spindles 15.

The actuation of the final stage torque units 16, as stated above, is initiated automatically upon stalling of the fluid motors 14 of the first stage units. The solenoid coil 90 of the four-way actuated valve is connected to a suitable source of power, there being a conductive line 95 running from one lead 96 of the power source to one end of the solenoid coil, the other end of the solenoid coil having a line 97 connected thereto running to a stationary contact 98 of a pressure switch 99, the movable contact 100 of the pressure switch being connected to another lead or line 101 running to the other pole 102 of the power source. The pressure switch 99 includes a body member 103 which is threaded or otherwise inserted, into the fluid pressure supply pipe 75, extending to the fluid motors 14, on the outlet side of the three-way solenoid valve 64. The pressure in this line 75 acts upon a Bourdon tube 104 which is pin connected to a link 105 that is, in turn, pin connected to the movable arm 106 of the switch carrying the contact 100. Normally, the movable contact 100 is spaced away from the stationary contact 98 of the switch, the circuit to the four-way solenoid valve 84 being open. This condition will remain while the fluid motors 14 of the first stage of the apparatus are operating to rotate the driven shafts or spindles 15. However, as these motors 14 come to a complete stall, the pressure in the lines 75, 40 leading to them will increase to a point sufficient to shift the Bourdon tube 104 and move the movable contact 100 into engagement with the stationary contact 98, thereby completing the circuit through the coil 90 of the four-way valve 84. When the circuit is completed, the plunger 89 is drawn within the coil to shift the valve to the position disclosed in Fig. 8, in which fluid under pressure is permitted to pass through the forward actuating lines 33, to operate upon the rotor vanes 31 of both units 16, the motion being transmitted through the overrunning clutch 35, 38 to the driven spindles 15, to further tighten the threaded fastening elements, until the motors 16 stall. The second or final stage pressure regulator 81 will have previously been adjusted to provide a pressure corresponding to the final torque tightness of the threaded fastening elements.

As stated above, the fluid motors 14 of the first stage apparatus will have given each threaded fastening element a preliminary tightening. Accordingly, the final stage units 16 need only operate through a few degrees of rotation to bring the threaded fastening elements to their final torque tightness. However, in the event that either of the rotors 21 move beyond a predetermined extent, then the four-way solenoid actuated valve 84 is caused to operate to reverse the direction of fluid entering the stator housings 17 and shift the rotors 21 back to their starting positions, whereupon the solenoid valve 84 is again energized to effect shifting of its head 87 to again cause fluid to pass through the forward actuating lines 33.

To accomplish this last-mentioned purpose, the solenoid coil 70 of the three-way valve 64 is connected in a circuit that is in parallel with limit switches 110 mounted on the stator housings 17, these limit switches being of the toggle type (Figs. 1, 3 and 4). Each switch 110 has an arm 111 standing between a pair of arms 112, 113 secured to the rotor 21 and extending laterally thereof. Actually, each arm 112, 113 has an adjusting screw 114 thereon secured in any desired position by a lock nut 115. One of the arms 113 will serve to engage the toggle switch arm 111 in the event the rotor 21 has moved too far in a forward or power direction, in order to shift the toggle switch 110 which controls the circuit running through the coil 70 of the three-way solenoid valve 64. The reversal of the rotation of the rotor 21 to its initial starting position will cause another arm 112 to engage the toggle switch arm 111, to return it to its initial position, when the rotor 21 reaches its initial starting position, to properly control the circuit to the solenoid coil 70 of the three-way valve.

The circuit to the three-way valve 64 may be derived from the same power source 96, 102 as the coil 90 of the four-way valve 84. A line 116 from one end of the coil 70 is connected to one side 101, 102 of the power supply, another line 117, which extends from the other end of the coil 70, being connected to a terminal 118 of each toggle switch 110 mounted on the stator housing 17. The other terminal 119 of each toggle switch is connected to a line 120 leading to the other side 96 of the power supply.

The toggle switches 110 are both normally in open position, so that no current passes through the coil 70 of the three-way solenoid valve 64, the spring 73 of this valve maintaining the rotor or head 67 in a position allowing fluid to pass from the source of pressure into the fluid motor lines 75, 40. However, should one of the rotors 21 of the final stage units 16 be shifted in a forward direction to too great an extent, in which its vanes 31 approach the opposite stator vanes 29, then its arm 113 will shift the toggle switch lever 111, closing the toggle switch 110 and completing the circuit to the coil 70 of the three-way solenoid valve. The plunger 69 is then drawn within the coil, to shift the valve head 67 to a position exhausting the lines 75, 40 leading to the stall type of fluid motors 14. As these lines are exhausted, the pressure therein will drop, which allows the Bourdon tube 104 to contract and shift the movable contact 100 from the stationary contact 98, opening the circuit through the coil 90 of the four-way solenoid operated valve 84. Upon opening of this circuit, the spring 92 shifts the valve head 87 to a position in which the fluid under pressure is placed in communication with the reverse actuating lines 34, the forward actuating lines 33 being allowed to exhaust to atmosphere, thereby causing all of the rotors 21 to be shifted back to their initial starting position. When these positions are reached, then a rotor arm 112 engages the toggle switch arm 111, to open the switch 110 and the circuit to the coil 70 of the three-way valve, allowing the spring 73 of the latter to shift the valve rotor 67 to its initial position, with the fluid under pressure again passing to the fluid motor lines 75, 40. When this occurs, the back pressure again builds up in the line 75 to cause the pressure actuated switch 99 to close, completing the circuit to the coil 90 of the four-way solenoid valve, and causing the plunger 89 to again be drawn inwardly to shift the valve head 87 into a position in which the reverse actuating lines 34 are in communication with the atmosphere, and the fluid under pressure is in communication with the forward actuating lines 33, to impart further rotation and turning effort to the rotors 21, in order to tighten the threaded fastening elements to the predetermined final torque values.

After all of the threaded fastening elements have been tightened to the predetermined extent, the control lever 76 can be released to shift the three-way manually operated valve 53 to a position closing the inlet line 52 and placing the outlet line 61 in communication with the atmosphere. This position allows the fluid motor lines 75, 40 to bleed to atmosphere and causes the pressure actuated switch 99 to open, opening the circuit to the four-way solenoid operated valve 84, allowing the spring 92 to shift its head 87 to a position in which the reverse actuating lines 34 are effective to return all of the rotors 21 to their initial starting positions.

It is, accordingly, apparent that an apparatus has been provided, which is capable of tightening a threaded fastening element in stages to a very accurate extent. The fact that the first stage apparatus for preliminary tightening of the threaded fastening element need not possess any great degree of accuracy permits use of devices that operate at comparatively high speeds. The final torque tightness is secured by the relatively slow speed and partial revolution unit 16. Since the first stage apparatus 14 need not tighten the threaded fastening element to the final extent, they can possess a smaller capacity, which enables them to be made of a smaller size. In addition, the size of the first stage units 14 can be further reduced because they can be made to operate at comparatively high speeds, without fear that the inertia forces will introduce any errors into the final tightening, since the first stage units do not accomplish such final tightening at all.

The operation of the first stage unit 14 in preliminarily tightening the threaded fastening element automatically initiates operation of the second or final stage unit 16, which, as stated above, operates in a rather slow manner, so as to introduce no appreciable inertia forces into the extent of tightening of the threaded fastening element. Not only are inertia forces substantially absent during the final tightening, but motor impulses and vibration as well. In addition, the fact that a time interval elapses between the completion of the operation of the first stage apparatus 14 and the institution of the operation of the second stage apparatus 16 minimizes the heating of the work. Any heat that may have been generated, due to the friction between the threads of the threaded fastening element and its companion member, can be dissipated to some extent, the slow speed operation of the second stage unit 16 supplying very little heat to the work. Accordingly, the threaded fastening element does not expand to any substantial extent so as to introduce error in the final tightening of the threaded fastening element upon its cooling.

The intercommunication between the various torque units 16 through the fluid lines 33 makes them function together as a fluid differential. Thus, if one final stage torque unit 16 tightens its associated threaded fastening element before the other final stage torque unit tightens its threaded fastening element, the first unit will stall, but will continue to exert its effort on its threaded fastening element. Accordingly, if the other final stage torque unit tightens its threaded fastening element to a certain extent, which will tend to relieve the first threaded fastening element of some of its tightness, then the fact that the turning effort is still being applied to the first-mentioned unit will cause it to retighten its threaded fastening element. As a matter of fact, the retightening occurs as the second element is being brought to its tightened condition, so that all of the threaded fastening elements are tightened to the same extent at substantially the same time. The intervening fluid under pressure acts to insure the automatic take-up of tightness of a threaded fastening element, in the event that another threaded fastening element has tended to relieve it of some of its torque or load.

The inventor claims:

1. In apparatus for tightening a threaded fastening element: a first device for tightening the element to a torque value lower than a desired higher torque value; a second device connected to said first device for tightening the element to the desired higher torque value, said second device including a fluid motor; means including a valve for feeding fluid under pressure to said motor; and means responsive to the operation of said first device in tightening the element to the lower torque value for opening said valve to initiate operation of said fluid motor.

2. In apparatus for tightening a threaded fastening element: a first device for tightening the element to a torque value lower than a desired higher torque value, said device including a first fluid motor; a second device connected to said first device for tightening the element to the desired higher torque value, said second device including a second fluid motor; first means for supplying fluid under pressure to said first fluid motor; second means for supplying fluid under pressure to said second fluid motor; and means responsive to the pressure of fluid supplied to said first motor for initiating passage of fluid through said second means to said second fluid motor.

3. In apparatus for tightening a threaded fastening element: a first device for tightening the element to a torque value lower than a desired higher torque value, said device including a first fluid motor; a second device connected to said first device for tightening the element to the desired higher torque value, said second device including a second fluid motor; first means for supplying fluid under pressure to said first fluid motor; second means for supplying fluid under pressure to said second fluid motor; a valve for controlling flow of fluid through said second means; electromagnetic means for operating said valve; a circuit for said electromagnetic means; and means responsive to the pressure of fluid in said first fluid motor for controlling said circuit to open said valve and effect operation of said second fluid motor.

4. In apparatus for tightening a plurality of threaded fastening elements: a plurality of first devices for simultaneous application to said elements to tighten said elements to a torque value lower than a desired higher torque value; a plurality of second devices, each coupled to a first device, for tightening the elements to the desired higher torque value, each of said second devices including a fluid motor; means common to all of said fluid motors for conducting fluid under pressure simultaneously to all of said motors; and means responsive to operation of said first devices for initiating passage of fluid through said conducting means to said motors.

5. In apparatus for tightening a plurality of threaded fastening elements: a plurality of first devices for simultaneous application to said elements to tighten said elements to a torque value lower than a desired higher torque value; a plurality of second devices, each coupled to a first device, for tightening the elements to the desired higher torque value, each of said second devices including a fluid motor; means common to all of said fluid motors for conducting fluid under pressure simultaneously to all of said motors; and means responsive to operation of said first devices, when said first devices have tightened the threaded fastening elements to the lower torque value, for initiating passage of fluid through said conducting means to said motors.

6. In apparatus for tightening a plurality of threaded fastening elements: a plurality of first devices for simultaneous application to said elements to tighten said elements to a torque value lower than a desired higher torque value, each of said first devices including a first fluid motor; a plurality of second devices, each coupled to a first device, for tightening the elements to the desired higher torque value, each of said second devices including a second fluid motor; first means for supplying fluid under pressure to said first motors; second means for supplying fluid under pressure to said second motors; and means responsive to the pressure of fluid in said first means for opening said second means to passage of fluid to said second motors.

7. In apparatus for tightening a plurality of threaded fastening elements: a plurality of first devices for simultaneous application to said elements to tighten said elements to a torque value lower than a desired higher torque value, each of said first devices including a first fluid motor; a plurality of second devices, each coupled to a first device, for tightening the elements to the desired higher torque value, each of said second devices including a second fluid motor; first fluid supply means simultaneously communicating with all of said first motors; second fluid supply means simultaneously communicating with all of said second motors; and means operated by the pressure of fluid in said first means for enabling fluid under pressure to pass through said second means to said second motors.

8. In apparatus for tightening a plurality of threaded fastening elements: a plurality of first devices for simultaneous application to said elements to tighten said elements to a torque value lower than a desired higher torque value, each of said first devices including a first fluid motor; a plurality of second devices, each coupled to a first device, for tightening the elements to the desired higher torque value, each of said second devices including a second motor; first fluid supply means simultaneously communicating with all of said first motors; second fluid supply means simultaneously communicating with all of said second motors; a valve for controlling flow of fluid through said second means; electromagnetic means for operating said valve; a circuit for said electromagnetic means; and means responsive to the pressure of fluid in said first fluid supply means for controlling said circuit and open said valve to produce operation of said second fluid motors.

9. In apparatus for tightening a plurality of threaded fastening elements: a plurality of first devices for simultaneous application to said elements to tighten said elements to a torque value lower than a desired higher torque value, each of said first devices including a first fluid motor of the stall type; a plurality of second devices, each coupled to a first device, for tightening the elements to a desired higher torque value, each of said second devices including a second fluid motor; first means for supplying fluid under pressure to said first motors; second means for supplying fluid under pressure to said second motors; and means responsive to the pressure of fluid in said first means as said first motors stall for opening said second means to the passage of fluid to said second motors.

10. In apparatus for tightening a plurality of threaded fastening elements: a plurality of first devices for simultaneous application to said elements to tighten said elements to a torque value lower than a desired higher torque value, each of said first devices including a first fluid motor of the stall type; a plurality of second devices, each coupled to a first device, for tightening the elements to a desired higher torque value, each of said second devices including a second fluid motor of the stall type; first means for supplying fluid under pressure to said first motors; second means for supplying fluid under pressure to said second motors; and means responsive to the pressure of fluid in said first means as said first motors stall for opening said second means to the passage of fluid to said second motors.

11. In apparatus for tightening a plurality of threaded fastening elements: a plurality of first devices for simultaneous application to said elements to tighten said elements to a torque value lower than a desired higher torque value, each of said first devices including a first fluid motor of the stall type; a plurality of second devices, each coupled to a first device, for tightening the elements to a desired higher torque value, each of said second devices including a second fluid motor of the stall type; first means for supplying fluid under pressure to said first motors; second means for supplying fluid under pressure to said second motors; a valve for controlling flow of fluid through said second means; electromagnetic means for operating said valve; a circuit for said electromagnetic means; and means responsive to the pressure of fluid in said fluid supply means as said first motors stall for controlling said circuit and opening said valve to produce operation of said second fluid motors.

12. In apparatus for tightening a threaded fastening element: a driven member adapted to be coupled to the threaded fastening element; a first motor connected to said driven member to tighten the element to a torque value lower than a desired higher torque value; a second motor for tightening the element to the desired higher torque value; means including an overrunning clutch releasably connecting said second motor to said driven member; and means responsive to the operation of said first motor in tightening the element to the lower torque value to initiate operation of said second motor to tighten the element to the higher torque value.

13. In apparatus for tightening a threaded fastening element: a driven member adapted to be coupled to the threaded fastening element; a first device connected to said driven member to tighten the element to a torque value lower than a desired higher torque value, said device including a first fluid motor; a second device for tightening the element to the desired higher torque value and including a second fluid motor; means including an overrunning clutch releasably connecting said second device to said driven member; first means for supplying fluid under pressure to said first fluid motor; second means for supplying fluid under pressure to said second fluid motor; and means responsive to the pressure of fluid supplied to said first motor for initiating passage of fluid through said second means to said second fluid motor.

14. In apparatus for tightening a threaded fastening element: a driven member adapted to be coupled to the threaded fastening element; a first device connected to said driven member to tighten the element to a torque value lower than a desired higher torque value, said device including a first fluid motor; a second device for tightening the element to the desired higher torque value and including a second fluid motor; means including an overrunning clutch releasably connecting said second device to said driven member; first means for supplying fluid under pressure to said first fluid motor; second means for supplying fluid under pressure to said second fluid motor; a valve for controlling flow of fluid through said second means; electromagnetic means for operating said valve; a circuit for said electromagnetic means; and means responsive to the pressure of fluid in said first fluid supply means for controlling said circuit to open said valve and effect operation of said second fluid motor.

15. In apparatus for tightening a threaded fastening element: a first device for tightening the element to a torque value lower than a desired higher torque value, said device including a first fluid motor; a second device connected to said first device for tightening the element to the desired higher torque value, said second device including a second fluid motor; first means for supplying fluid under pressure to said first fluid motor; second means for supplying fluid under pressure to said second fluid motor; and means responsive to and operable by the pressure of fluid supplied to said first motor, when such pressure reaches a predetermined value, for initiating passage of fluid through said second means to said second fluid motor.

References Cited in the file of this patent

UNITED STATES PATENTS

| 2,069,882 | Hall | Feb. 9, 1937 |
| 2,379,878 | Bronander | July 10, 1945 |
| 2,602,361 | Meyer et al. | July 8, 1952 |
| 2,616,323 | Leifer | Nov. 4, 1952 |
| 2,627,770 | Hautau et al. | Feb. 10, 1953 |